(No Model.) 4 Sheets—Sheet 1.

W. STAGG.
PRESSURE OR VACUUM GAGE.

No. 598,030. Patented Jan. 25, 1898.

Witnesses

Inventor
William Stagg
By James L. Norris
Atty.

(No Model.) 4 Sheets—Sheet 2.
W. STAGG.
PRESSURE OR VACUUM GAGE.
No. 598,030. Patented Jan. 25, 1898.
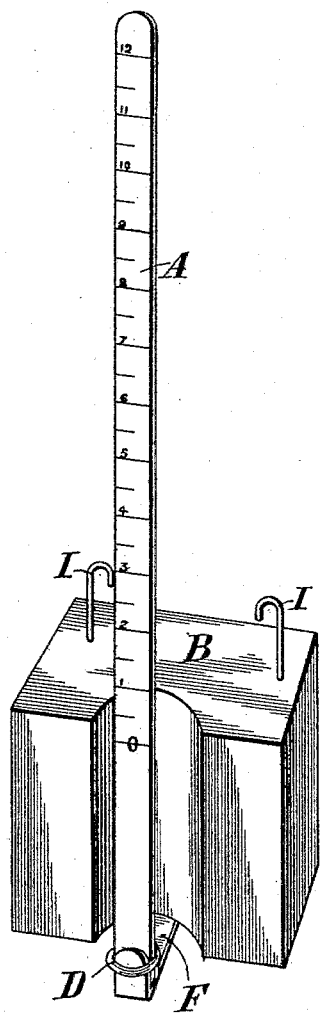
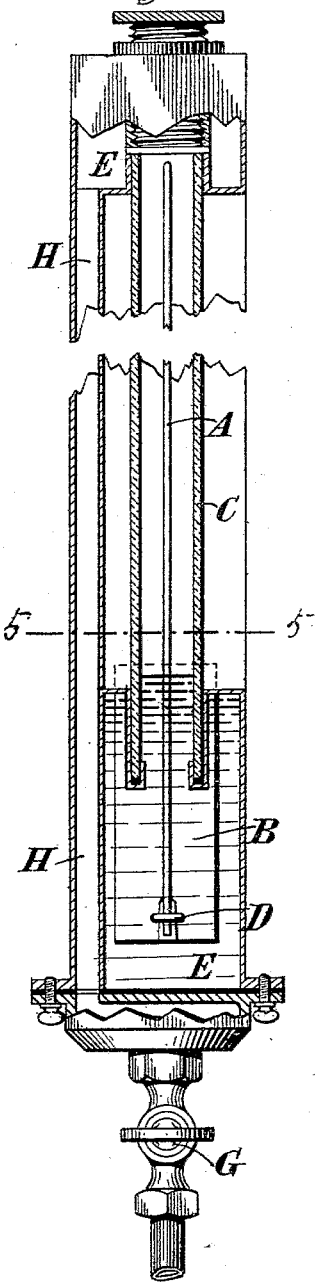
Witnesses
Inventor
William Stagg (No Model.) 4 Sheets—Sheet 3.

W. STAGG.
PRESSURE OR VACUUM GAGE.

No. 598,030. Patented Jan. 25, 1898.

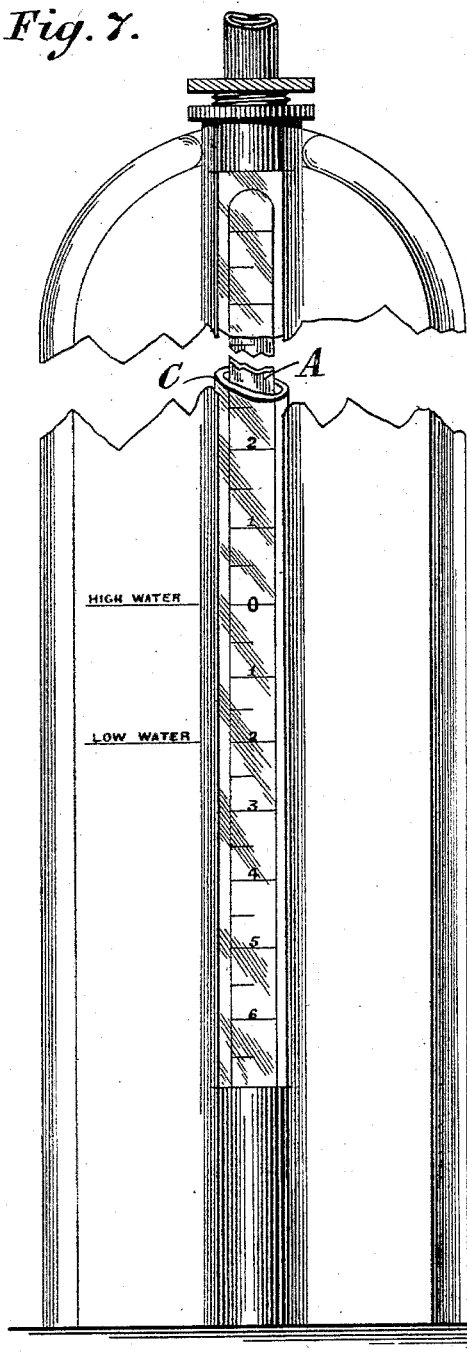
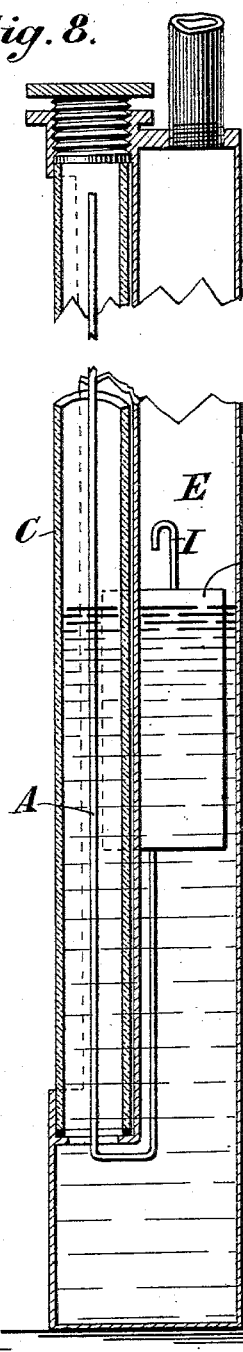

UNITED STATES PATENT OFFICE.

WILLIAM STAGG, OF BRISTOL, ENGLAND, ASSIGNOR TO THE THOMAS GLOVER & COMPANY, LIMITED, OF LONDON, ENGLAND.

PRESSURE OR VACUUM GAGE.

SPECIFICATION forming part of Letters Patent No. 598,030, dated January 25, 1898.

Application filed October 18, 1897. Serial No. 655,604. (No model.) Patented in England December 21, 1896, No. 29,318.

*To all whom it may concern:*

Be it known that I, WILLIAM STAGG, a subject of the Queen of Great Britain, residing at Canons Marsh, Bristol, England, have invented certain new and useful Improvements in and Connected with Pressure or Vacuum Gages, (patented in Great Britain, No. 29,318, dated December 21, 1896,) of which the following is a specification.

This invention has for its object to construct pressure or vacuum water or other fluid gages in such a manner as to obviate the usual inconveniences arising from the use of such pressure or vacuum gages as hitherto constructed. For instance, in ordinary pressure-gages, in which a column of water is the active principle wherewith the pressure is made manifest to an observer, it has been necessary to add the readings above and below zero of the gage when at rest to the readings after the observation, thereby frequently leading to mistakes or inconvenience, whereas according to this invention the zero position of the gage is absolute under all circumstances, notwithstanding any difference in the volume of water employed in the gage—whether the same has been reduced or added to.

The invention will be clearly understood by reference to the annexed drawings, aided by the following description.

Figure 1:
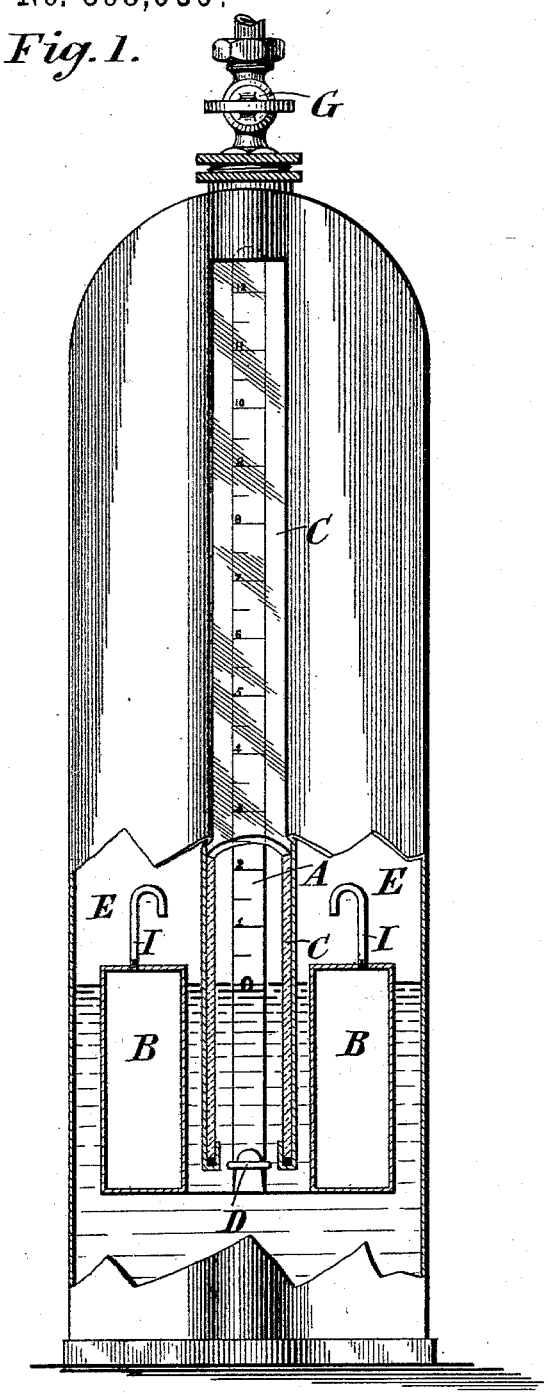
Figure 2:
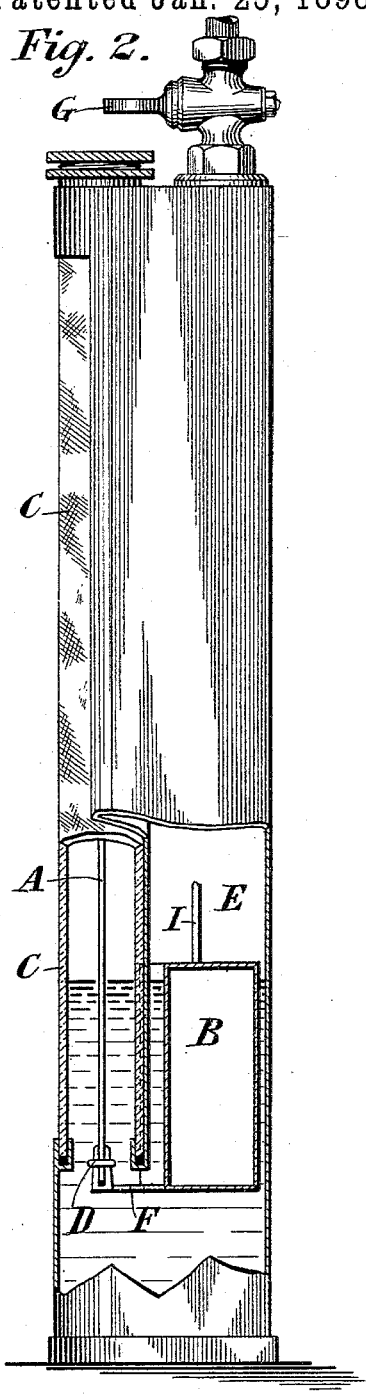
Figure 6:
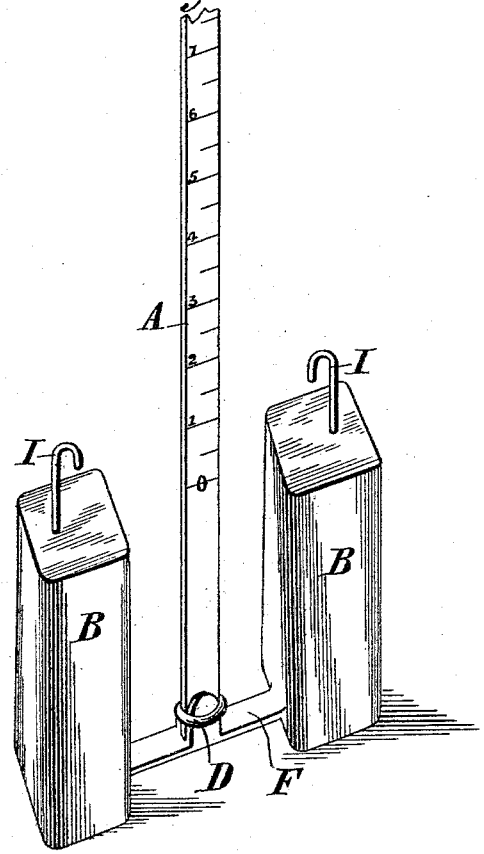
Figure 5:
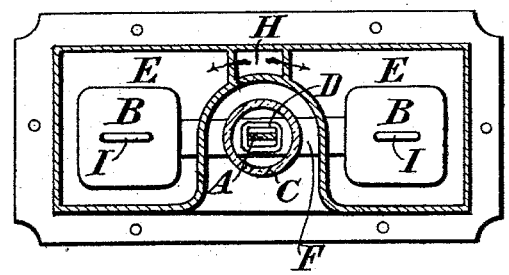

Figure 1 is a part sectional front elevation, and Fig. 2 a part side elevation, of a pressure-gage when the gas enters from the top and showing the relative positions of the float and index or scale when at zero. Fig. 3 is a perspective elevation of the float and index. Fig. 4 is a sectional side elevation of a pressure-gage when the gas enters from the bottom and in which two connected floats are employed. Fig. 5 is section through the line 5 5 of Fig. 4. Fig. 6 is a perspective elevation of the two connected floats with the index or scale attached to the connecting-bar. Fig. 7 is an elevation of a pressure and vacuum gage, and Fig. 8 is a sectional side elevation of same.

In carrying the invention into practice the scale A, upon which the readings are marked, is attached to the float B with the zero of the scale corresponding in position with the level of the water-line of the immersed float or floats B, whereby it follows that any increase or reduction in volume of the indicating fluid has no effect upon the registration of the zero position with the water-line, as before mentioned. The scale A is preferably carried within the glass tube C, wherein the water rises or falls to indicate the pressure or partial vacuum, as the case may be. Said scale may be connected in any suitable manner, such as by a band D or a wire, to the float or floats B, which is or are contained within a chamber E, of relatively large capacity, behind or connected to the indicating-tube C and the pressure positive or minus.

The gas or other fluid to be tested is led in upon the top of the fluid in which the float B is partially immersed for forcing or withdrawing the fluid into or from the said indicating-tube C, thereby causing the upper surface to register upon the scale A either above or below zero and render a direct and immediate reading to the observer without calculating or calibration of the instrument.

In Figs. 1, 2, and 3 I show only one float, which has a hollowed side and at its base a projecting piece F for carrying the scale A, the scale being about flush with the sides of the float; but at Figs. 4, 5, and 6 I show two floats, connected at their base by a strap or bridge-piece F, which carries the scale A, and the apparatus is constructed for the gas to enter at the bottom by the tap G and pass up the pipe or channel H to enter the chamber E. In all these figures the apparatus is constructed for pressure only. The gas entering by the tap G and acting upon the water in the chamber E forces it up the tube C, the top of the water indicating by the scale the amount of pressure applied.

In Figs. 7 and 8 the apparatus is constructed for vacuum as well as pressure, in which case the scale A is continued below the float (zero being about mid-distance) and by a return or bent portion connected to the float, so that when pressure is applied the water rises up the tube; but when a vacuum-register is required the action of the water is the reverse.

In Fig. 7 I have shown high-water and low-water indications, these being the extreme limits between which the water-level, and consequently zero, should be at for the proper working of the apparatus.

I I are air-ducts to the floats; but they may be dispensed with, if desired.

I have shown the scale attached to the float or floats by a band D; but any means of attachment may be employed so that the scale may be adjusted to fix the zero-marking at the water-line of the float irrespective of the capacity of the float.

A vent-hole is provided at the top of the glass tube, which is connected to the casing in a water-tight manner.

A further application of the principle allows of an arrangement whereby the resistance to the flow of gas or other fluid through a piece of apparatus or manufacturing plant, such as a set of purifying apparatus, may be continuously shown. This is made possible by combining the inlet and outlet pressures on the one gage. The resistance will then be shown by the difference of levels of the water or other registering fluid, and provision may further be made for registering also the full inlet or outlet pressure at the aforesaid piece of apparatus or plant.

What I claim, and desire to secure by Letters Patent, is—

1. In a fluid-pressure or vacuum gage, the combination of a chamber and a transparent tube connected with the chamber at its lower end, of a float arranged in the chamber, and an upright graduated scale arranged in the tube and connected at its lower end to said float, the zero-mark on the scale corresponding in position with the level of the water-line of the immersed float, substantially as described.

2. In a fluid-pressure or vacuum gage, the combination with an upright chamber and a transparent tube connected together and communicating with each other at their lower ends, of a pressure or vacuum pipe communicating with the chamber, a float arranged in the chamber, and an upright graduated scale arranged in the transparent tube and connected at its lower end to and carried by the float, the zero-mark on the scale corresponding in position to the level of the water-line of the immersed float, substantially as described.

3. In a fluid-pressure or vacuum gage, the combination with an upright chamber and a transparent tube connected together and communicating with each other at their lower ends, of a pressure or vacuum pipe communicating with the chamber above the contained liquid and a vent arranged in the upper end of the tube, a float arranged in the chamber and an upright graduated scale arranged in the tube and connected at its lower end to and carried by the float, the zero-mark on the scale corresponding in position to the level of the water-line of the immersed float, substantially as described.

In testimony whereof I have hereunto set my hand in presence of two subscribing witnesses.

WILLIAM STAGG.

Witnesses:
FREDERICK JOHN BEAUMONT,
FRANK FREDERICK SEABORNE.